Patented Apr. 7, 1953

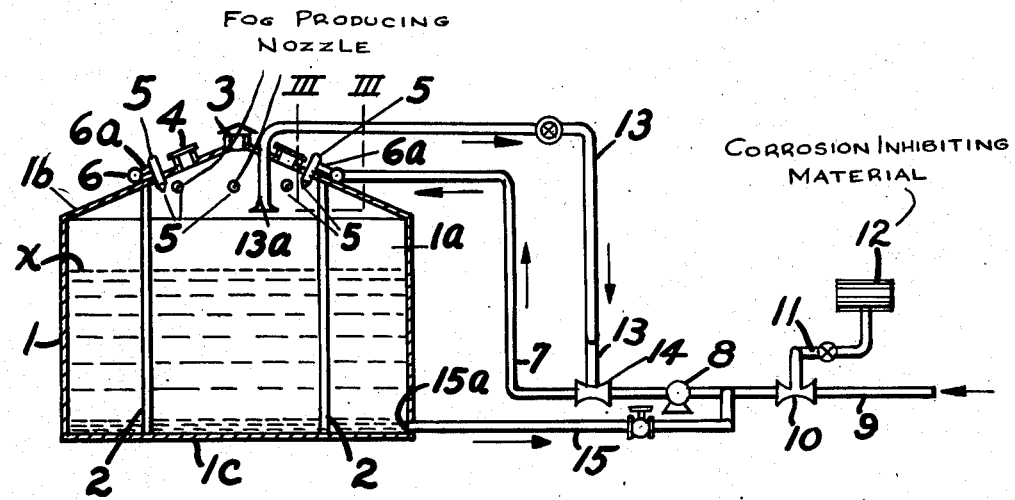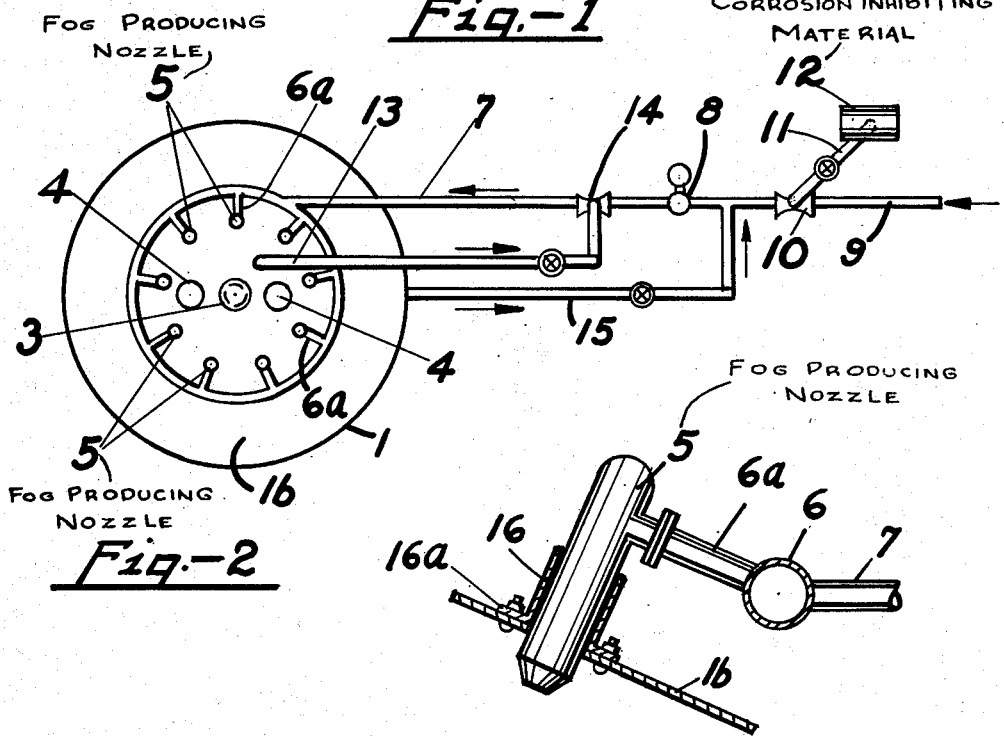

2,634,223

UNITED STATES PATENT OFFICE 2,634,223

METHOD FOR INHIBITING CORROSION IN STORAGE VESSELS

Edward H. Clendenin, Plainfield, and Walter A. Wurth, Cranford, N. J., assignors to Standard Oil Development Company, a corporation of Delaware Application July 1, 1949, Serial No. 102,566

7 Claims. (Cl. 148—6)

1

The present invention relates to a method for inhibiting corrosion of structural metal in storage vessels, including the cargo tanks of tank ships and other forms of containers for the bulk storage of liquid materials. In the storage of liquids, and more particularly, in the storage of volatile liquids of the nature of hydrocarbon liquids, considerable corrosion of structural elements may result either from contact by vapors escaping from the stored liquid itself, or from contact by atmospheric air which may enter the vapor space normally existing above the stored liquid. In most any storage vessel exposed to the sun and atmospheric conditions, the temperature of the vessel walls, or of the vapor space within such a vessel, will vary over a wide range. Such variations not only result in evaporation of the stored contents of the vessel, but also produce periodic "breathing" of the vessel due to changes in internal pressure created by the changes in temperature. During the daytime, the sun's rays and atmospheric temperature may increase the temperature in the vapor space of a storage vessel, and of the liquid contents, to such a degree as to expel from the vessel some portion of the contained liquid in the form of vapor. Then, during the evening hours, the vessel and its contents will be cooled by the change in atmospheric temperatures, creating a partial vacuum within the vessel tending to draw in atmospheric air. The air drawn in usually contains water vapor which may be condensed on the inner surfaces of the cooled vessel. Rusting and other corrosion is thus produced. The corrosion problem is intensified when the air drawn into the vessel is sea air, which has been found to have a highly corrosive effect. Under tropical or sub-tropical atmospheric conditions, the temperature changes, and the effect thereof may be extremely pronounced. Also, where the storage vessel is a tank located in an industrial area where the air may contain comparatively large quantities of fumes derived from manufacturing processes, other corrosive materials may be drawn into the vapor space of the vessel. It has been found that under such circumstances, corrosion proceeds at a rapid rate on any metallic surfaces exposed to contact by either the aspirated air, or vapors which may be derived from the contents of the tank.

According to the present invention, it is proposed to provide a method by which such corrosion is inhibited, either by coating the inner exposed surfaces of the vessel with a material which will effectively neutralize the corrosive substances, or which will provide a coating on

2 the normally exposed inner surfaces, resistant to action of the corrosive substances. Another object of the invention is to provide a method whereby such treatment of the inner surfaces of a storage vessel may be accomplished with a minimum use of materials and labor.

The invention and its objects may be more fully understood from the following description when read in conjunction with the accompanying drawings, in which Figure 1 is a vertical section through a typical storage vessel, in which an inhibitor system and conduit connections are shown in semi-diagrammatic form;

Figure 2 is a plan view of a storage vessel, according to Figure 1, showing a comparable system and conduit connections; and Figure 3 is an enlarged view of a section of the vessel roof taken along the line III—III of Figure 1.

Referring more particularly to the drawings, the numeral 1 designates a typical storage vessel which, as shown, is a conventional cone roof storage tank having side wall portions $1a$, roof portion $1b$, and a bottom $1c$. Representative of supporting structure for the tank and roof are post elements 2. The roof $1b$, as illustrated, is of generally conventional construction and is provided with a vent or breather valve 3, as well as with various and conventional openings such as manholes 4. To the conventional structure are added a plurality of fog nozzle members 5 extended through suitable openings in the roof $1b$ so as to permit discharge of a suitable liquid material into the vapor space within the vessel 1 in the form of finely divided liquid particles, such as to form a fog of the materials in the vapor space of the vessel above the level $x$ of liquid materials stored therein.

The nozzles 5 may be mounted with respect to the roof $1b$ in any suitable fashion. As shown in Figure 3, they may be provided with a flanged collar element 16 secured in fluid-tight relation to the nozzle 5 as by welding, the assembly being mounted and secured to the vessel roof by means of the flanged portions $16a$, with the outlet of the nozzle 5 extending into the vapor space within the vessel. The nozzles 5 may be supplied by means of a header conduit 6 connected to the several nozzles 5 as by branch lines $6a$.

Liquid materials to be introduced into the storage vessel by way of the nozzles 5 are supplied to the header 6 by means of a conduit 7 connected to the header 6 at one end and to a pump 8 at the other end. The pump 8 is in turn connected at its suction side to a source of liquid supply, as by means of a conduit 9. An eductor mechanism 10 in the line 9 is provided for the introduction of corrosion-inhibiting or other materials into the liquid supplied to the nozzles 5 with a valved conduit 11 connecting the eductor with a supply source 12 for such materials. A valved conduit 13 having an inlet 13a in the vapor space of the tank is connected into the conduit 7 beyond the pump 8 through an eductor mechanism 14, and a valved conduit 15 having an inlet 15a adjacent the bottom 1c of the vessel 1 is connected into the line 9 on the suction side of the pump 8, and preferably between the pump and the eductor 10.

In operation, according to the method contemplated, and employing the apparatus described above, the container 12 is filled with a corrosion-inhibiting material, as a finely divided solid material, or a concentrated solution of a corrosion-inhibiting material, for example, an aqueous solution thereof. The conduit 9 being connected to a suitable solvent or carrier liquid supply, upon operation of the pump 8, liquid drawn through the eductor 10 by the pump suction and pressure of the supply source may be utilized to withdraw from the container 12 any desired proportionate quantity of the corrosion-inhibiting material contained therein, this material being mixed with the main stream by the action of the eductor 10 and the pump 8. The stream of liquid discharged from the pump 8 through the line 7 is then passed through the header 6 and branch lines 6a to be discharged into the vessel as a fog of corrosion-inhibiting liquid by way of the fog nozzles 5. The solution thus discharged from the nozzles 5 is in the form of a fog of liquid particles in which a major portion will have a particle size in the range of from about 0 to about 50 microns such that they may remain suspended in the atmosphere of the vapor space above the liquid level $x$ in the tank 1 for a considerable period of time. Sufficient quantities of the liquid solution are thus introduced into the vapor space so as to substantially fill it to the point where the fog of such solution tends to be discharged through any venting means provided, as through breather valve 3.

In order to insure the maintenance in the vapor space of the vessel 1 of a liquid fog of the materials introduced by way of nozzles 5, and to avoid excessive discharge of the fogged solution through the breather valve 3, the fog of such solution in the vapor space may be continuously or intermittently withdrawn through the conduit 13 coalesced and recombined in liquid form with the fresh stream of solution passed through the conduit 7. As shown, this may be accomplished by means of the eductor mechanism 14 in the line 7. Any vapors which may be derived from the contents of the vessel and circulated in this fashion may be expected to create no substantial difficulty, as the volume of such vapors will be small, and a certain portion thereof will be condensed on contact with the stream of liquid in the conduit 7, or upon discharge through the fog nozzles 5.

By introducing the corrosion-inhibitor solution as a fog of such a solution rather than a spray thereof, the solution is brought into more intimate contact with every exposed portion of the interior of the vessel above the liquid level $x$, including the tank walls, roof and supporting structures exposed in the vapor space in the vessel. In addition, the contact of the fog particles with such surfaces will be enhanced by the action of convection currents within the vapor space of the vessel, which currents will maintain a more or less constant circulation of the fog particles within the vapor space, thereby bringing fresh portions of the fog into contact with the exposed surfaces.

As the fog particles contact the exposed structural surfaces of the vessel in the vapor space, they will tend to coalesce, and to form on these surfaces a film of the corrosion-inhibiting solution. Also, where the fog is introduced during a period when the temperature of the vapor space and of the structural elements are above normal atmospheric temperatures, the liquid particles of which the fog is composed may be vaporized by contact with the heated structural materials. Any vapor of the inhibiting solution which is thus formed, will tend to be retained in the vapor space until such time as the temperature of the structural elements may be reduced to below that temperature at which the vapor will condense, such condensation taking place primarily on contact of the vapors with the cooled structural surfaces of the vessel, will effect an addition to the film of inhibiting solution which may previously have been formed by coalescence of the liquid fog particles in contact therewith.

In the operation described, it is contemplated that the fog of inhibiting solution preferably will be introduced at a time when the temperature of the tank structure induced by atmospheric conditions is relatively high, and just prior to, or coincident with, atmospheric changes which may subsequently tend to reduce the temperature thereof. For example, it would be found desirable to introduce a fog of inhibitor solution into a vessel of the character described just about at sunset, when, with the removal of the direct contact of the sun's rays with the exterior surfaces of the vessel, and with the usual accompanying reduction in atmospheric temperatures, the vessel structure may be expected to be cooled. It is also contemplated that the introduction of the solution fog will be continued for a period of time during which the attained temperatures of the tank structure are reduced by atmospheric changes to a more nearly normal degree such that vaporized portions of the solution may be condensed by contact with the vessel walls.

It is contemplated that the corrosion-inhibiting solution, introduced by way of the nozzles 5, normally will be a solution of materials substantially immiscible with the contents of the vessel. Although coalescence of the fog particles and condensation of the vaporized solution constituting the fog may produce an excess of the solution in liquid form, beyond that required to provide a suitable film on the exposed interior surfaces of the vessel, due to the reduced quantities of solution required for adequate contact and coating of the exposed interior surfaces, as compared with the quantities experienced where the solution is sprayed, the excess will present no real problem. Means may be provided, however, for disposition of any excess solution, particularly where the solution used is immiscible with the vessel contents. Under such circumstances, the excess solution may be permitted to accumulate as a settled layer and withdrawn from the vessel to be discharged as waste, or, where desired, it may be recirculated and re-introduced with the fresh, fog-forming stream of solution. For the latter purpose, the conduit 15 is provided so as to withdraw the settled solution from the vessel under suction of the pump 8, thereby combining the settled solution with the fresh stream of solution introduced into the pump by way of conduit 9. Depending upon the circumstances encountered, removal of the settled solution may be substantially continuous or intermittent, and the material withdrawn may be clarified or otherwise treated prior to re-use.

In the method as described, various inhibiting substances may be employed, the primary requirement or characteristic being that they form a substantially complete solution with the inhibitor vehicle. Materials such as sodium chromate, sodium bichromate, with or without added alkali, or phosphates, including tri-sodium phosphate, alone or in combination with chromates may be employed in an aqueous vehicle. Materials such as aqueous solutions of dibasic sodium phosphate and of boric acid, or sodium tetraborate may also be employed. In most instances, it is preferred to use an inhibitor material which, in the form of a solution, will react chemically with the metal surfaces to be treated to form a surface coating which will be substantially integral with the coated metal. The chromates, phosphates and borates mentioned all have this characteristic in some degree. Other materials, including ammonia, may be found desirable directly to neutralize the corrosive vapors or liquids which may come in contact with the surfaces involved. Under most circumstances, it will be preferable to form aqueous solutions of the inhibiting substances, and particularly when employed in vessels containing hydrocarbons or other materials substantially immiscible with water.

The concentration of the inhibitor substance employed in any vehicle may vary to some extent, but will usually be determined by the condition to be overcome. Satisfactory resistance to rusting of ferrous metals has been obtained by the use of aqueous solutions of 5% sodium tetraborate or boric acid, or 1% each of the two when employed in combination. Likewise acceptable results have been obtained when using a solution containing ½% of phosphoric acid with 2% tribasic sodium phosphate. In using chromate solutions, such as solutions of sodium bichromate, sufficient amounts of the chromate must be used to prevent pitting which is found to occur occasionally when using concentrations below 1.0 gram per liter of solution.

While the method has been disclosed with reference to apparatus shown in a fixed installation, the application of a fog of an inhibitor solution of the character set forth may also be accomplished with equivalent results by the use of portable equipment, temporarily connected to header and nozzle elements permanently installed as shown, or by introducing portable conduits and nozzles through the conventional openings provided in a tank roof, as through manholes 4. Also, two or more tanks may be treated from a single pump and solution forming apparatus, by the use of branch lines connected to permanently installed conduits 7, headers 6 and nozzles 5, or to temporary conduits and nozzles discharging through openings such as manholes 4.

The apparatus disclosed for application of corrosion-inhibiting solutions may also be employed as a fire-protection system. As shown in the drawings, the supply conduit 9 may be connected to a water supply source, and water may be supplied directly to the fog nozzles 5 for discharge as a fire-extinguishing or protective fog into the vapor space within the storage vessel, the valves in lines 11, 13 and 15 being closed. Likewise, by introducing a foam-forming material by way of the container 12, and the eductor mechanism 10 in the conduit 9, a foam-forming solution may be discharged through the nozzles 5 to produce fog-foam which will not only substantially fill the vessel vapor space, but will also provide a foam blanket on the surface of the vessel contents.

Although illustrated and described with reference to its application to a conventional cone roofed storage tank, the inventive concept involved is equally applicable to all forms of storage vessels in which structural elements may be continuously or intermittently exposed to a corrosive atmosphere in a vapor space above the level of the liquid contents of the vessel. The method as set forth is equally applicable to cone-roofed tanks, spheroids and spheres, and to the cargo tanks of tank-ships.

What is claimed is:

1. A method for inhibiting corrosion of the inner surfaces of metallic storage vessels, comprising substantially filling the free space within such vessel above a liquid stored in such vessel with a fog of a liquid solution of a corrosion-inhibiting material in the form of finely divided liquid particles a major portion of said particles having a particle size in the range of from about zero to about 50 microns dispersed throughout the atmosphere of the free space and substantially suspended therein, said fog substantially filling said free space to the extent that it tends to be vented from the vessel introducing said fog during a period when the vessel walls are at an initial temperature above normal atmospheric, and maintaining said fog in the free space during at least a portion of a period in which the inner surfaces of said vessel are cooled below said initial temperature, depositing a thin film of said solution on the exposed inner surfaces of said vessel by intimate contact of the fog therewith.

2. A method according to claim 1 in which the liquid solution of a corrosion-inhibiting material is an aqueous solution of such material.

3. A method according to claim 2, in which the liquid solution of a corrosion-inhibiting material is an aqueous solution of a material selected from the class consisting of sodium chromate and sodium bichromate.

4. A method according to claim 1 in which the corrosion-inhibiting material is a neutralizing agent for corrosive vapors which may be present in the vessel.

5. A method according to claim 4, in which the neutralizing agent is an ammonia.

6. A method according to claim 1, in which the fog is maintained in said free space at least partially by withdrawal from said free space of portions of said finely divided liquid particles from said vapor space, combining said withdrawn portions with a stream of said liquid solution, coalescing said particles therein, and introducing said stream into the free space of said vessel as a fog of finely divided liquid particles.

7. A method according to claim 1, in which the fog is maintained in said free space at least partially by withdrawal from said vessel of portions of a settled layer of coalesced, inhibitor solution fog particles, combining said withdrawn portions with a fresh stream of said inhibitor solution and introducing the combined liquid into the free space as a fog of finely divided liquid particles.

EDWARD H. CLENDENIN.
WALTER A. WURTH.

REFERENCES CITED

The following references are of record in the file of this patent:

UNITED STATES PATENTS

| Number | Name | Date |
|---|---|---|
| 750,986 | Lapp | Feb. 2, 1904 |
| 1,996,747 | Butterworth | Apr. 9, 1935 |
| 2,042,274 | Pollock | May 26, 1936 |
| 2,089,648 | Gordon | Aug. 10, 1937 |
| 2,186,177 | Romig | Jan. 9, 1940 |
| 2,230,004 | Morgan | Jan. 28, 1941 |
| 2,330,051 | Heidt | Sept. 21, 1943 |
| 2,383,402 | Maurer et al. | Aug. 21, 1945 |

FOREIGN PATENTS

| Number | Country | Date |
|---|---|---|
| 571,752 | Great Britain | Sept. 7, 1945 |
| 885,592 | France | May 31, 1943 |